United States Patent [19]

Teay

[11] Patent Number: 5,203,371

[45] Date of Patent: Apr. 20, 1993

[54] GAS REGULATOR WITH SEVERAL STAGE ADJUSTMENT

[76] Inventor: Jaw-Shiunn Teay, No. 40, Niu-Chou Tzu, Ling-Nan Village, Dung-Shan Hsian, Tainan Hsien, Taiwan

[21] Appl. No.: 972,298

[22] Filed: Nov. 5, 1992

[51] Int. Cl.⁵ .................. G05D 16/06; F16K 17/28
[52] U.S. Cl. ...................... 137/460; 137/505.12; 137/505.46; 137/614.19
[58] Field of Search .............. 137/460, 505.12, 505.46, 137/614.19

[56] References Cited

U.S. PATENT DOCUMENTS

| | | | |
|---|---|---|---|
| 3,260,278 | 7/1966 | Lund et al. | 137/505.12 X |
| 4,579,142 | 4/1986 | Jung-Chao | 137/460 |
| 4,836,247 | 6/1989 | Chuang | 137/460 X |
| 5,158,107 | 10/1992 | Teay | 137/460 |

Primary Examiner—Stephen M. Hepperle

[57] ABSTRACT

A gas regulator with several stage adjustments comprises a main body, two regulating bases and two pressure regulators provided in two—one upper and the other lower—chambers in the main body for regulating the pressure in both chambers, two regulator caps to close up a top and a bottom side of the main body, a restoring unit for releasing a stopper in a micro adjusting unit from an opening of a first passageway to restore ordinary gas supply in case of automatic stoppage of the opening by extremely large gas flow caused by leakage, and a micro adjusting unit having the stopper to be adjusted in its position to change sensibility of stopping gas supply in case of disorder.

1 Claim, 7 Drawing Sheets

5,203,371

GAS REGULATOR WITH SEVERAL STAGE ADJUSTMENT

BACKGROUND OF THE INVENTION

At present, common automatic gas flow controllers have a principal function of stopping a gas passageway by means of a stopper pushed up by pressure difference at both ends of the stopper caused by gas leakage or disorder of a pressure regulator. In practical use, gas coming from an inlet tubeof high pressure or an outlet tube has no gas because of long intermittent use; excessive gas volume may flow into instantly and a gas tank is opened again, forcing the stopper rise up to block the passage as a temporary gas stoppage. On the contrary, when gas inflow is of low pressure, the gas in the tank becomes low, and gas outflow also decreases, causing unbalanced gas supply.

SUMMARY OF THE INVENTION

A gas regulator with several stage adjustments has been devised in the present invention, intended to have features as follows for improving disadvantages of conventional gas regulators.

1. Gas pressure is always kept at a stably balanced condition.
2. Inner pressure of an upper and a lower chamber in the regulator body can be adjusted according to various stoves.
3. It can automatically stop gas supply in case of gas leakage.
4. Sensibility of a micro adjusting unit can be adjusted to acquire real safe control of gas flow.
5. The micro adjusting unit has a protective cap to prevent a connected rod from being touched by a careless person, to safeguard the sensibility of the micro adjusting unit.

DETAILED DESCRIPTION OF THE INVENTION

Figure 1:
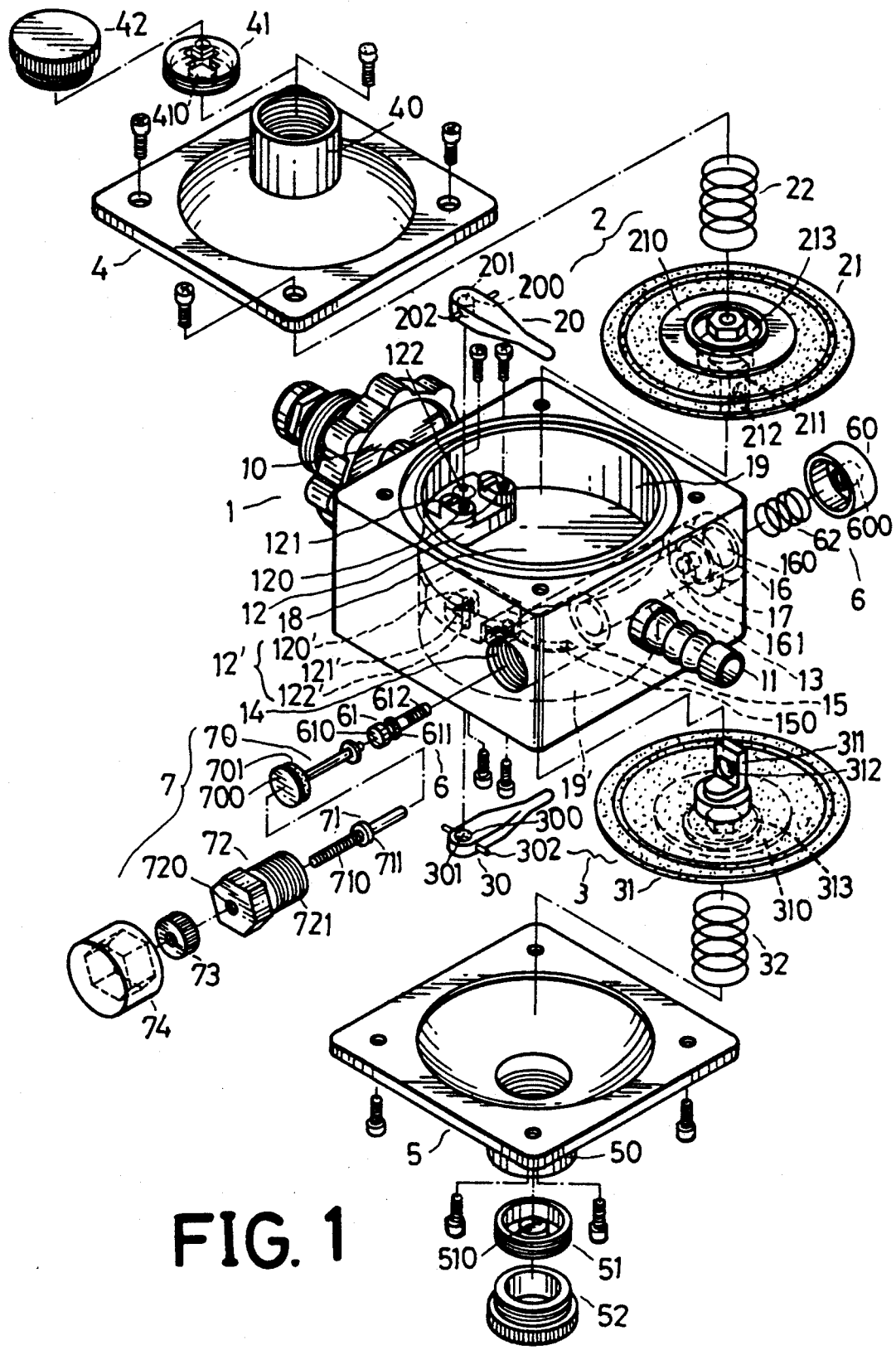
FIG. 1 is an exploded perspective view of a gas regulator with several stage adjustments in the present invention.

A gas regulator with several stage adjustments in the present invention, as shown in FIG. 1, comprises a main body 1, an inlet tube 10 attached to the left of the main body 1 and connected with a rotatable disc 100, an outlet tube 11 attached to the right of the main body 1, a first passageway 13 in a right portion communicating with the outlet tube 11, and a nut hole 14 and a second passageway 15 communicating with the first passageway 13. The second passageway 15 communicates with the first passageway 13. The second passageway 15 has a lower notch 150 communicating with the cavity of the main body 1 and a connecting tube 16 of two different sizes 160, 161 extending rearward communicating with the first passageway 13 and an annular groove 17 is provided around its outer surface. A separating plate 18 is set between the first regulating base 12 and the first passageway 13, separating the cavity into an upper chamber 19 and a lower chamber 19', in which a second regulating base 12' is opposite to the first regulating base 12. The two regulating bases 12, 12' have corresponding threaded holes 120, 120', pin holes 121, 121' behind the threaded holes 120, 120', and through holes 122, 122' behind the pin holes 121, 121'. The through hole 122 in the first regulating base 12 communicates only with the inlet tube 10, but the through hole 122' does with the upper and the lower chamber 19, 19'.

Two pressure regulators 2, 3 are respectively combined with the first and the second regulating bases 12, 12' in the upper and the lower chambers 19, 19', having two regulating plates 20, 30, two regulating diaphragms 21, 31 and two springs 22, 32 combined together. The regulating plates 20, 30 are shaped to slope from the rear to the front in a pointed cone fashion, having recesses 200, 300 in its bottom for fillers 201, 301 to fit therein, and pins 202, 302 extending sidewise. The regulating diaphragms 21, 31 have carrying members 210, 310 and pulling members 211, 311 connected with regulating plates 20, 30 fixed tightly on an upper surface and a lower surface. The pulling members 211, 311 have connecting openings 212, 312 in its ends, and the carrying members 210, 310 have spring grooves 213, 313 for springs 22, 32 to lodge therein.

Two caps 4, 5 are provided to cover and be screwed on and under the main body 1, respectively having cylindrical cap posts 40, 50, threaded adjusting blocks 41, 51 and turnable caps 42, 52 combined with the cap posts 40, 50. The adjusting blocks 41, 51 respectively have projections 410, 510 for springs 22, 32 to fit around.

A restoring unit 6 is provided to combine with a rear portion of the main body 1, having a push cap 60 extending out the main body 1, a push rod 61 connected with the push cap 60 and extending in the connecting tube 16 and the first passageway 13 in the main body 1. The push rod 61 has a push head 610 at one end and an anti-leak ring 611 attached to the head 610, possible to block up a small diameter portion 161 of the connecting tube 16 to prevent gas leakage, and a thread at the other end and is fitted around by a spring 62. A female thread 600 is provided in the push cap 60 fitting in the annular groove 17 in the main body 1 to screw with the push rod 61.

A micro adjusting unit 7 is provided in the front portion of the main body 1, having connecting rod 70, a sustaining rod 71, a nut 72, a rotatable button 73, and a protective cap 74. The nut 72 has a central threaded hole 720, a male thread 721 in a lower portion, and the connecting rod 70 extends in the second passageway 15 in the main body 1, having a stopper 700 at a bottom and an anti-leak ring 701 beside the stopper 700 to block up tightly the opening of the first passageway 13. The sustaining rod 71 abuts on the connecting rod 70, having a male thread portion 710, a stopper 711 in an intermediate portion, passing through the threaded hole 720 in the nut 72 and extending in the second passageway 15 in the main body 1. The rotatable button 73 screws with the end of the sustaining rod 71 and is contained in the protective cap 74.

Figure 2:
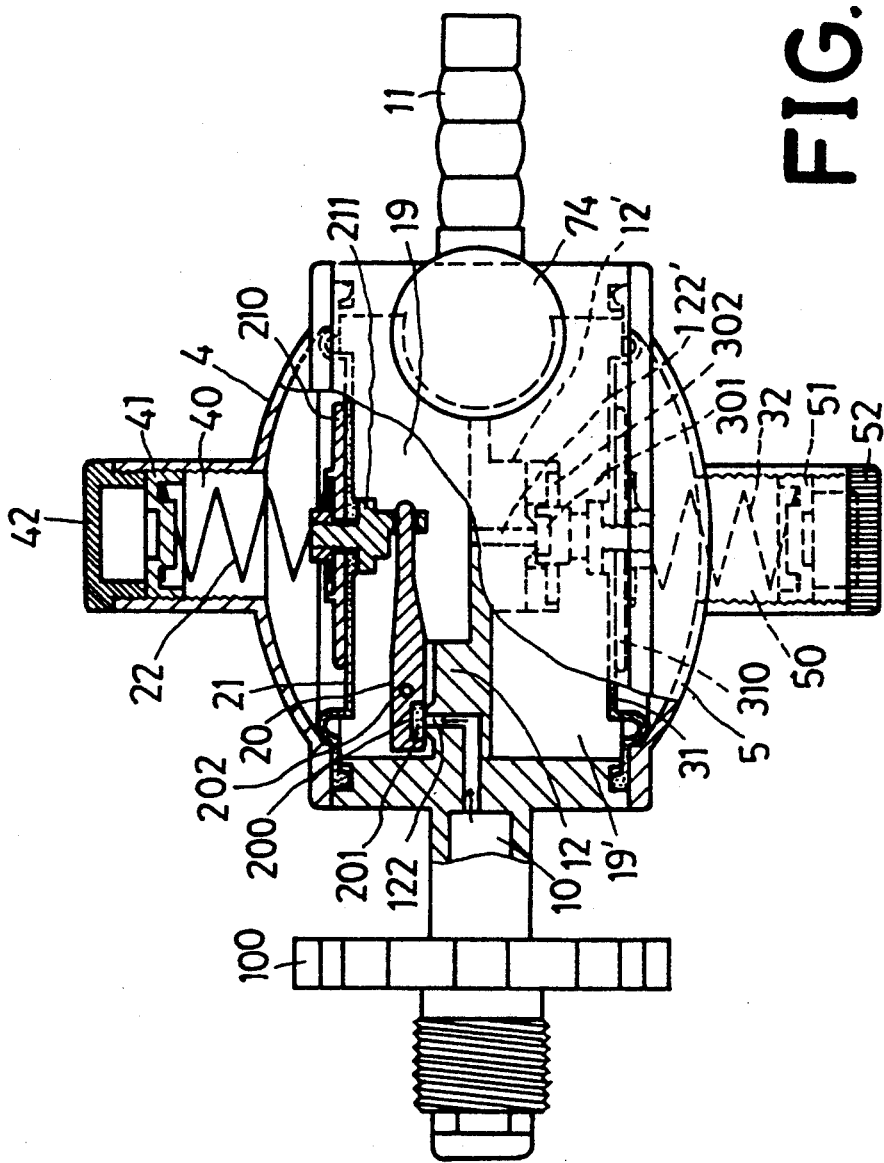
FIG. 2 is a cross-sectional view of a pressure regulator in condition of stopping gas in the gas regulator with several stage adjustments in the present invention.
Figure 3:
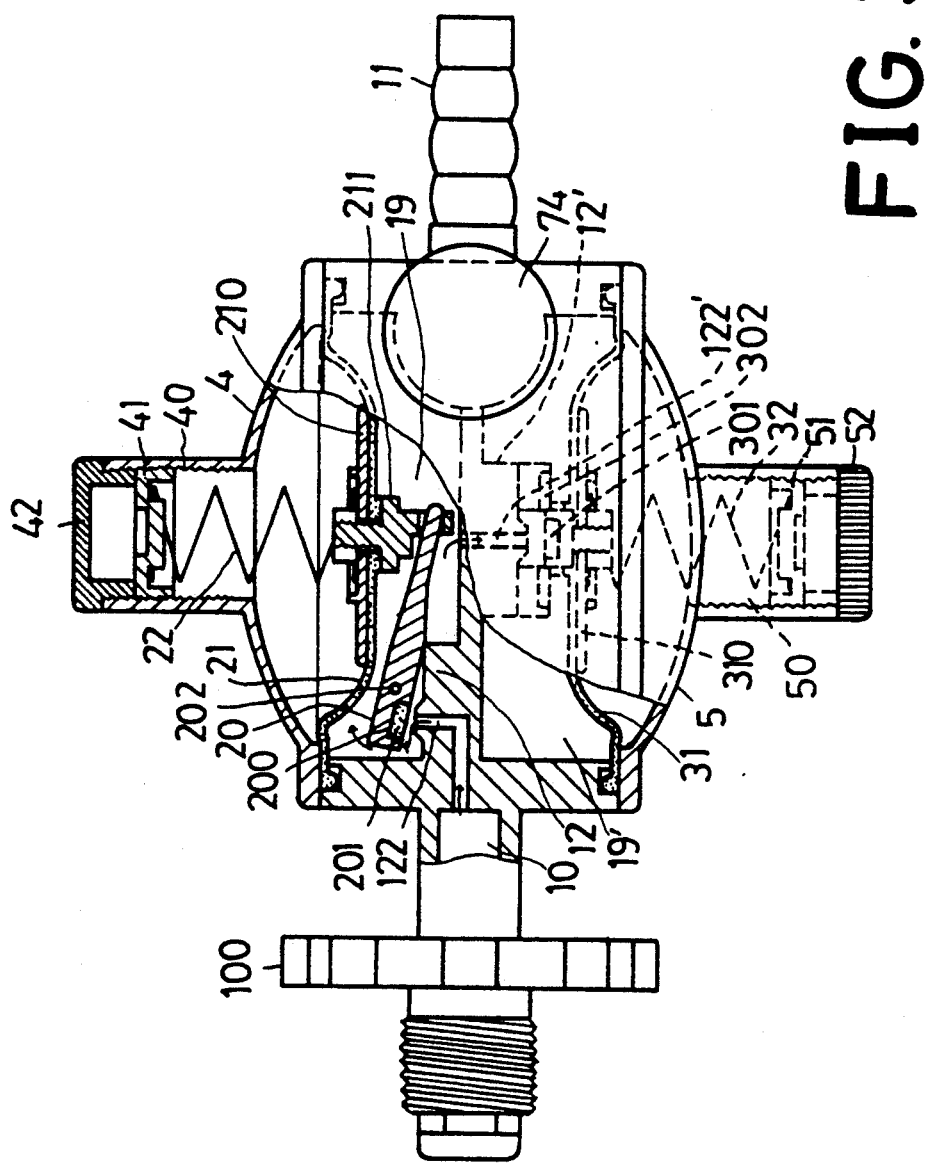
FIG. 3 is a cross-sectional view of the pressure regulator in condition of letting gas flow in the gas regulator with several stage adjustments in the present invention.
Figure 4:
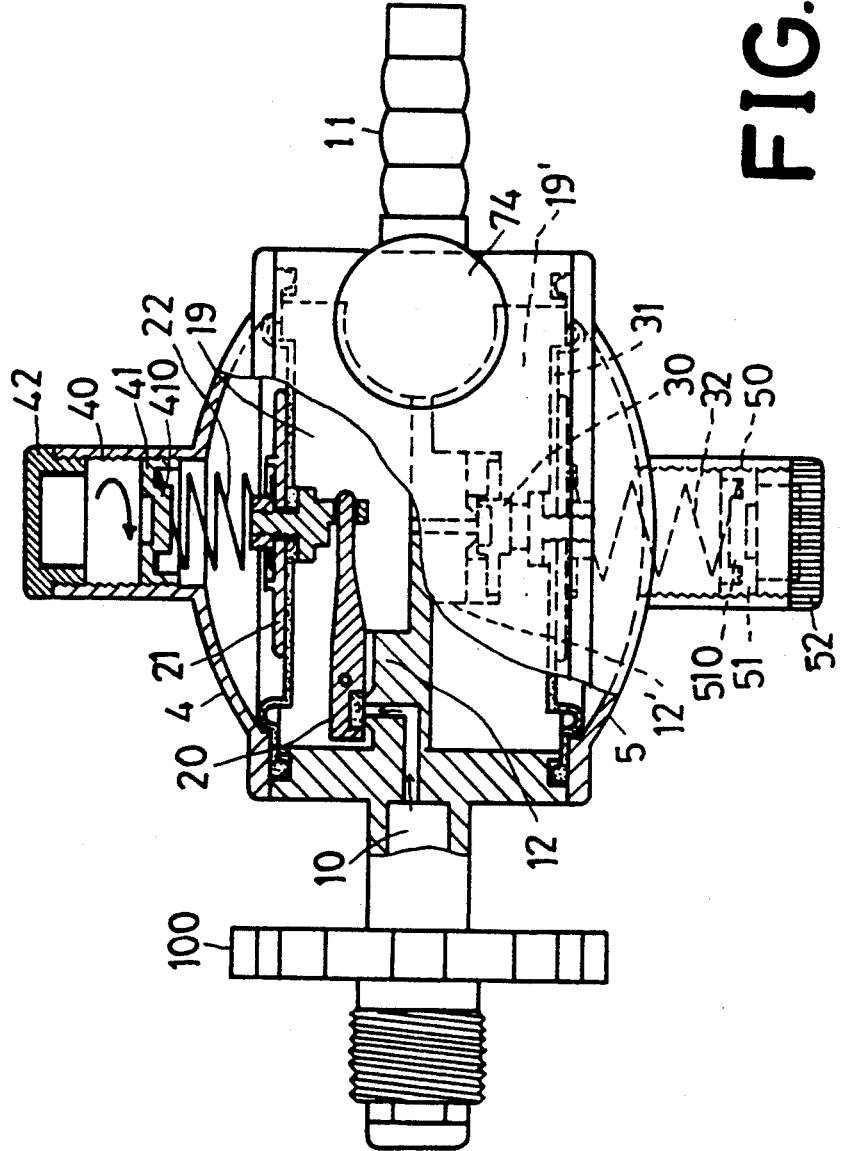
FIG. 4 is a cross-sectional view of two adjusting blocks in condition of being handled in the gas regulator with several stage adjustments in the present invention.

In normal operation of this gas regulator, gas in a gas tank flows in the inlet tube 10 and through the hole 122 of the first regulating base 12, filling in the upper chamber 19, actuating the first pressure regulator 2 to work, letting the regulating plate 20 extend outward to inflate the regulating diaphragm 21 compressing the spring 22. When the regulating plate 20 extends to a horizontal condition, the stopper 201 blocks the hole 122 as shown in FIG. 2, keeping the pressure in the upper chamber 19 definite. If the gas in the upper chamber 19 flows in the lower chamber 19' through the hole 122' in the second regulating base 12', the compressed spring 22 resiliently and quickly presses the diaphragm 21, causing the regulating plate 20 to shrink back, and then the stopper 21 blocks the hole 122 no more as shown in FIG. 3, permitting gas to flow in. The gas flowing in the lower chamber 19' from the upper chamber 19 is kept in a stabilized condition, controlled by the second pressure regulator 3. Then gas can be balanced in flowing into and out, not causing unbalanced supply or instant stoppage of gas. In addition, the inner pressure of the upper and the lower chamber can be adjusted according to difference of stoves, by handling the adjusting blocks 41, 51 of the regulator caps 4, 5 in changing their position in the cap posts 40, 50, letting the projections 410, 510 push the springs 22, 32 in various degrees of tightness as shown in FIG. 4.

Figure 5:
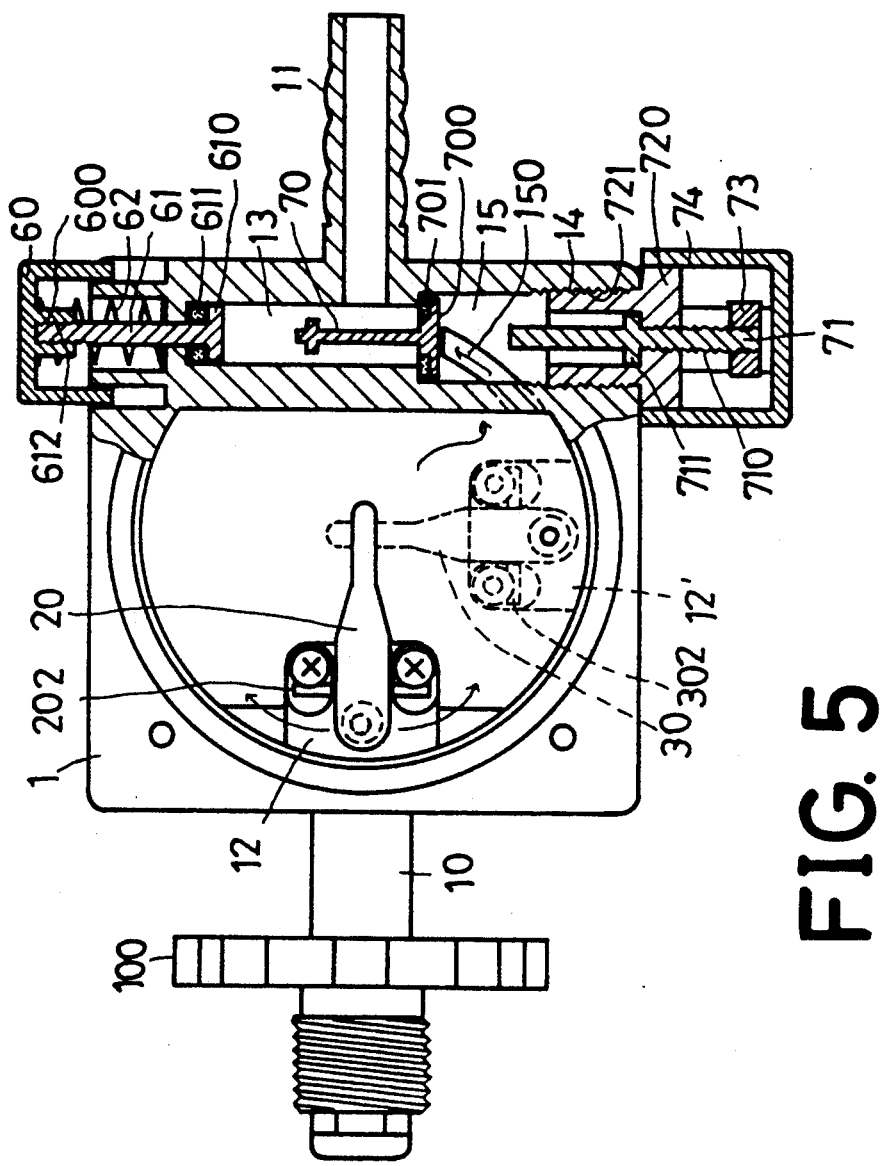
FIG. 5 is a cross-sectional view of a connected rod in a micro adjustor pushed to stop a passageway in the gas regulator with several stage adjustments in the present invention.

In case a stove connected with outlet tube 11 should become out of order to cause gas leakage, flowing speed of the gas in the leakage side or the outlet tube 11 would be much greater than the entering side or the inlet tube 10 permitting the pressure in the lower chamber 19' become greater than that at the leakage or the outlet tube 1, and thus breaking the original balanced pressure, to resultant pressure difference. However, the pressure difference and flowing speed can overcome the weight of the connecting rod 70, which is then to be pushed up to block the opening of the first passageway 13 as shown in FIG. 5. Consequently, supply of gas can be automatically cut off, preventing gas from flowing out continuously and thus obtaining security and safety in using the stove with this gas regulator.

Figure 6:
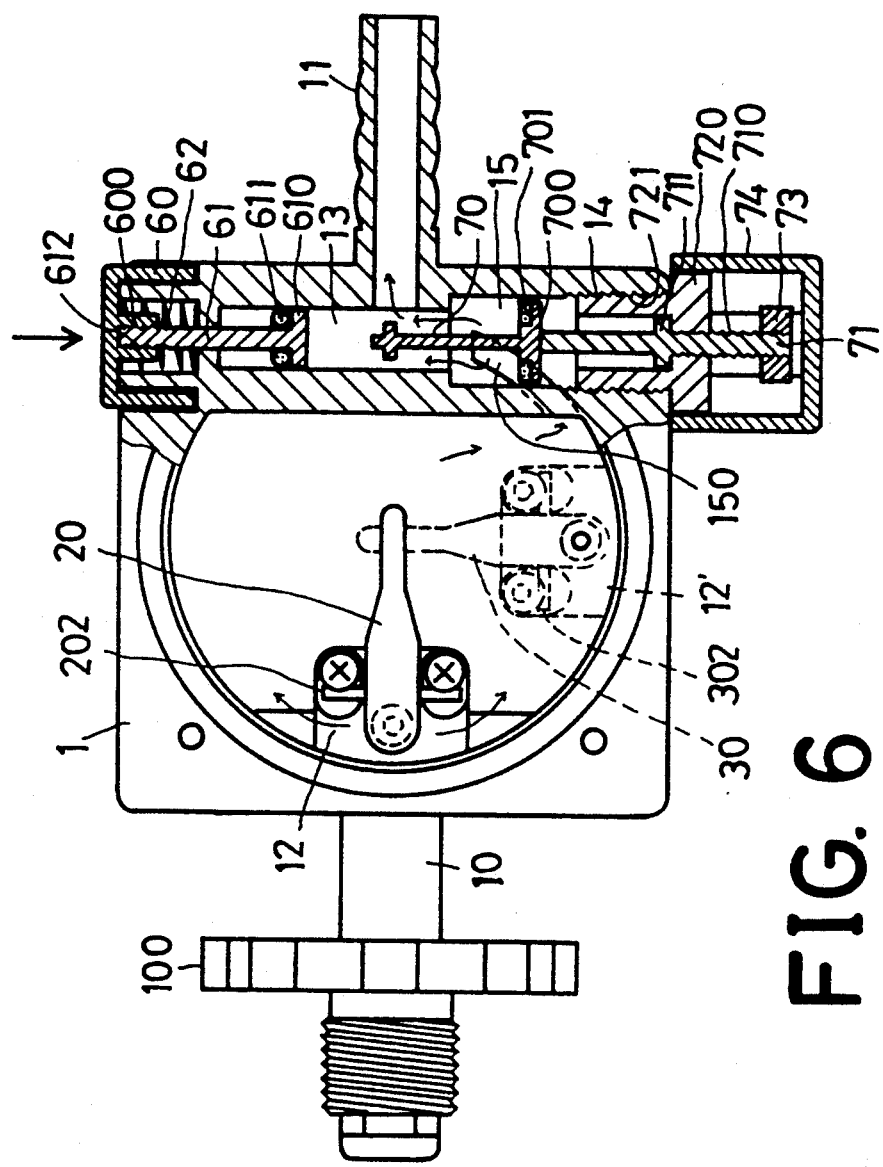
FIG. 6 is a cross-sectional view of a restoring unit in condition of operation in the gas regulator with several stage adjustments in the present invention.

After a disorder in the gas stove or the tubes is repaired the push cap 60 in the restoring unit 6 is to be pressed down, pushing down the push rod 61 to let the push head 610 move the connecting rod 70 down. Then the stopper 700 leaves off the opening of the first passageway 13. Now, the push cap 60 can be released, permitting the push rod 61 pushed down to leave off the first passageway 13 by the compressed spring 62 recovering its elasticity, making the gas flow as usual as shown in FIG. 6.

Figure 7:
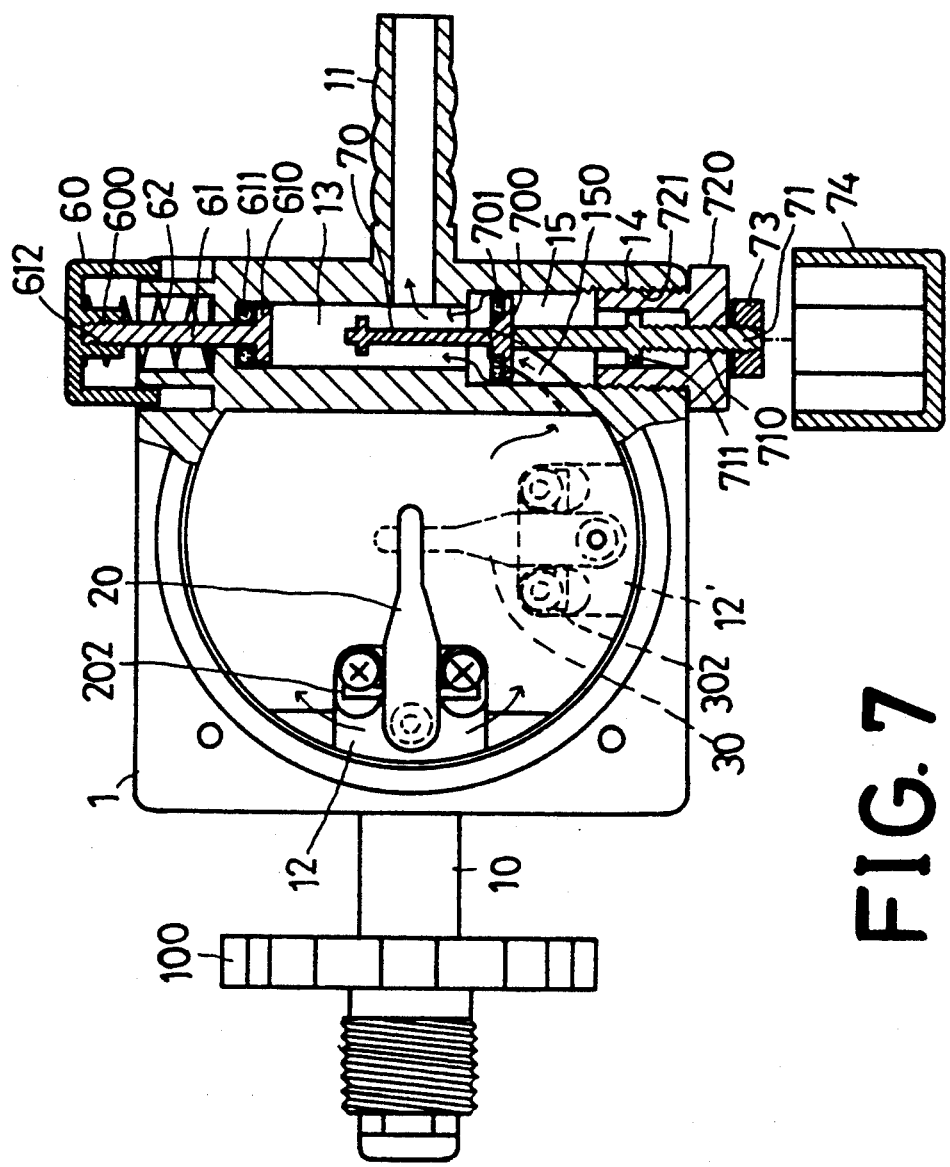
FIG. 7 is a cross-sectional view of the micro adjusting unit in condition of operation in the gas regulator with several stage adjustments in the present invention.

The micro adjusting unit 7 is provided to adjust sensibility of the stopper 700 to acquire the best possible safety to cut off gas supply in case of gas leakage, by rotating the rotatable button 73 to elevate or lower the sustaining rod 71 so as to push up or down the stopper 700 and thus to adjust the distance between the stopper 700 and the opening of the first passageway 15. FIG. 7 shows the condition of the micro adjusting unit 7 adjusted in the best sensibility. And the protective cap 74 can prevent the rotatable button 73 from being pushed carelessly.

What is claimed is:

1. A gas regulator with several stage adjustments comprises:

a main body connected with a gas inlet tube combined with a rotatable disc at its left side and with a gas outlet tube at its right side, having its inner cavity opened to the top and the bottom, a first regulating base near the inlet tube in the cavity, a first passageway vertically communicating with the outlet tube, a threaded nut hole abutting a second passageway communicating the first passageway, a notch in a lower in a lower portion of the second passageway to communicating with the inner cavity, a connecting tube of two different sizes extending rearward from the first passageway, an annular groove around the connecting tube, a separating plate dividing the inner cavity into an upper chamber and a lower chamber, a second regulating base the lower chamber in opposite direction of the first regulating base in the upper chamber, said second regulating base having a threaded hole, a pin hole behind the threaded hole, and a through hole behind the pin hole to communicate with both the upper and the lower chamber;

two pressure regulators respectively mounted on the top and the bottom of the first and the second regulating base, consisting of two resulating plates, two regulating diaphragms and two springs, said regulating plates shaped to slope from the rear to the front as a pointed cone and having a recess at its bottom, a filler filling in the recess and a sidewise pin extending from the rear, said diaphragms respectively having a carrying member and a pulling block fixed with a nut on the top surface and a bottom surface, said pulling blocks having a connecting opening, said carrying members having a spring groove for a spring to sit therein:

two regulator caps being secured on the top and under the bottom of said main body, respectively having a cap post on the top and under the bottom, each said cap post provided with a female thread to screw with an adjusting block and a rotatable cap, each said adjusting block having a lower projection for a spring to fit around;

a restoring unit combined in the rear of the main body, having a push cap extending out the main body, a push rod being in connected with the push cap and extending in the connecting tube and in the first passageway and having a push head at one end attached with an anti-leak ring for blocking the connecting tube to stop gas supply, and a male thread at the other end to screw with a female thread in the push cap, a spring fitting around the lower portion of the push rod, said push cap fitting in the annular groove around the connecting tube;

a micro adjusting unit being mounted in the front of the main body, having a connecting rod, a sustaining rod, a nut, a rotatable button and a protective cap, said nut having a central through threaded hole and a male thread in a lower portion, said connecting rod extending in the second passageway in the main body and having a stopper attached with an anti-leak ring for blocking an opening of the first passageway, said sustaining rod abutting the connecting rod and having a male thread in one end portion screwing with the central threaded hole in the nut to extend a little in the second passageway and a stop block in an intermediate portion, said rotatable button centrally screwing with the thread of the sustaining rod, and said protecting cap covering the rotatable button and fitting around the nut; and said first pressure regulator adjusting pressure difference caused between the upper chamber and a gas tank when the gas in the gas tank is made to flow in the upper chamber through the inlet tube, and letting gas flow in the lower chamber to balance pressure, said second regulator and said micro adjusting unit controlling the volume of the gas flowing in and out of this regulator in a stably balanced pressure, preventing instant stoppage or unbalanced volume of gas going out of this regulator, said adjusting blocks in the regulator caps being possible to change their positions in the cap posts by rotating them, said springs fitting around the projections of said adjusting blocks being changed their resilience by changing position of the adjusting blocks so that the inner pressure of the upper and the lower chamber can be adjusted to cope with different stoves, said connecting rod in the micro adjusting unit being pushed up to let its stopper block the opening of the first passageway to perform a safety measure of automatic cutting of gas supply, said push cap of the restoring unit being pressed to push down the connected rod to let its stopper leave off the opening of the first passageway for restoring ordinary supply of gas, said rotatable button of the micro adjusting unit being rotated to raise up or lower the stopper of the connected rod in adjusting the distance between the stopper and the opening of the first passageway so as to adjust sensibility of this regulator in cutting gas supply, said protective cap of the micro adjusting unit preventing the rotatable button from being touched carelessly.

* * * * *